(12) United States Patent
Udo et al.

(10) Patent No.: US 7,705,096 B2
(45) Date of Patent: Apr. 27, 2010

(54) MANUFACTURING METHOD OF RESIN FOR DEVELOPING AGENT

(75) Inventors: Motonari Udo, Mishima (JP); Takashi Urabe, Sunto-gun (JP); Tsuyoshi Ito, Izunokuni (JP); Masahiro Ikuta, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1013 days.

(21) Appl. No.: 11/410,642

(22) Filed: Apr. 25, 2006

(65) Prior Publication Data
US 2007/0249791 A1 Oct. 25, 2007

(51) Int. Cl.
*C08F 2/16* (2006.01)
*C08F 2/38* (2006.01)

(52) U.S. Cl. .......................................... 526/81; 526/89

(58) Field of Classification Search ....................... None
See application file for complete search history.

(56) References Cited

U.S. PATENT DOCUMENTS 6,566,467 B1 * 5/2003 Lyons ........................ 526/210

FOREIGN PATENT DOCUMENTS

JP 2003-231707 A 8/2003

* cited by examiner

*Primary Examiner*—David Wu
*Assistant Examiner*—Vu Nguyen
(74) *Attorney, Agent, or Firm*—Turocy & Watson, LLP

(57) ABSTRACT

In a manufacturing method of a resin for developing agent, a first polymerization agent is added in an aqueous medium; a radical polymerizable monomer is polymerized in the presence of a chain transfer agent to form a low molecular substance resin particle; after consuming the chain transfer agent, a second polymerization initiator is added in the aqueous medium; and the remaining monomer is polymerized to form a high molecular substance resin particle, thereby improving fixability of the developing agent.

20 Claims, 1 Drawing Sheet

Fig. 1

|  | Mn | Mw | Mw/Mn | Non-offset temperature width (°C) | Residual amount of chain transfer agent (ppm) |
|---|---|---|---|---|---|
| Example 1 | 4800 | 38000 | 7.76 | 130 to 180 | 21 |
| Example 2 | 4100 | 28000 | 6.83 | 120 to 170 | 18 |
| Example 3 | 4900 | 31000 | 6.24 | 125 to 180 | 23 |
| Example 4 | 5100 | 41000 | 7.91 | 130 to 180 | 26 |
| Comparative Example 1 | 4600 | 18000 | 3.91 | 120 to 150 | 195 |
| Comparative Example 2 | 4200 | 16000 | 3.84 | 120 to 150 | 267 |
| Comparative Example 3 | 4900 | 18000 | 3.77 | 120 to 150 | 142 |
| Comparative Example 4 | 4900 | 39000 | 8.03 | 140 to 170 | 207 |

MANUFACTURING METHOD OF RESIN FOR DEVELOPING AGENT

BACKGROUND OF THE INVENTION

1. Field of the Invention

The present invention relates to a manufacturing method of a resin for developing agent which is used in image forming devices, for example, copiers and printers.

2. Description of the Related Art

In general, in an image forming device, an electrical latent image is first formed on an electrostatic latent image carrier such as a photoreceptor. This latent image is developed with a toner. The developed toner image is transferred onto a transfer material such as paper. Then, an image is formed through fixation by heating or pressurization. A toner particle which is used for the image formation is mixed with a carrier particle and used as a two-component system developing agent. Alternatively, a magnetic toner particle or a non-magnetic toner particle is used as a single-component system developing agent in a single body.

In general, a toner particle is constructed of materials including a resin which becomes a binder, a coloring agent, a mold releasing agent such as waxes, and a charge inhibitor. In recent years, an emulsion polymerization coagulation method is employed as a formation method of toner particle.

The emulsion polymerization coagulation method is to form a toner particle by the following process. First of all, a dispersion of a resin as formed by emulsion polymerization is prepared, whereas a coloring agent dispersion having a coloring agent dispersed in a solvent is prepared. In addition, a dispersion of a wax is prepared, if desired. Then, by mixing the resin dispersion and the coloring agent dispersion and optionally the dispersion of a wax, a coagulated particle corresponding to the toner particle diameter is formed. Then, for example, by fusing the coagulated particle by heating, a fused particle is obtained, followed by washing, filtration and drying to form a toner particle.

According to this emulsion polymerization coagulation method, by selecting conditions such as heating temperature, it becomes possible to control the shape or surface composition of the toner particle in a prescribed form of, for example, from an amorphous form to a spherical form. By stably controlling the particle shape of the toner in a prescribed particle size, it is possible to suppress a lowering of developability and deterioration of image quality. Furthermore, by controlling the surface composition of the toner particle such that the wax is not exposed on the surface of the toner particle, it is possible to suppress contamination due to separation of the wax. In addition, by controlling the surface composition of the toner particle such that the coloring agent is not exposed on the surface of the toner particle, it is possible to suppress defective electrification. Accordingly, improvements in image quality and reliability can be expected.

In the thus formed toner particle, an improvement in fixability to a transfer material is required. Due to the improvement in fixability, it becomes possible to achieve more improvements in image quality and reliability. For improving the fixability, it is required to fix the toner particle to a transfer material with low energy and to suppress the generation of an offset phenomenon at high temperatures. In general, in the resin which becomes a binder in the toner particle, one having a low molecular weight is softened at low temperature so that it can be fixed to a transfer material with low energy. However, due to a lowering of viscoelasticity at high temperatures, an offset phenomenon is generated. On the other hand, one having a high molecular weight suppresses a lowering of viscoelasticity at high temperatures. However, its softening temperature is high so that high energy is required for fixation to a transfer material. In this way, a characteristic to control the fixability varies depending upon the molecular weight of the resin. Accordingly, in order to improve the fixability, it is necessary to control the molecular weight distribution of the resin in forming a toner particle.

Usually, in order to control the molecular weight distribution, the molecular weight must be adjusted in a stage of polymerizing a resin from a monomer. Then, for example, as described in JP-A-2003-231707, there is proposed a measure in which a chain transfer agent is added at a point of time when a degree of polymerization is from 10 to 80%, thereby forming a resin particle for toner. However, a measure capable of more easily controlling the molecular weight of a resin particle is required.

SUMMARY OF THE INVENTION

An object of the invention is to provide a manufacturing method of a resin for developing agent capable of more easily controlling the molecular weight distribution of a resin particle and improving fixability of a toner, thereby designing to improve image quality and reliability.

According to one embodiment of the invention, there is provided a manufacturing method of a resin for developing agent including; polymerizing a radical polymerizable monomer in an aqueous medium having a first polymerization initiator added therein in the presence of a chain transfer agent, thereby forming a resin particle having a first peak molecular weight; and polymerizing a radical polymerizable monomer in the aqueous medium in which the chain transfer agent is consumed and a second polymerization initiator is added, thereby forming a resin particle having a second peak molecular weight.

Also, according to another embodiment of the invention, there is provided a manufacturing method of a resin for developing agent including; adding a first polymerization initiator in an aqueous medium; adding a radical polymerizable monomer and a chain transfer agent in the aqueous medium; polymerizing a part of the monomer; adding a second polymerization initiator in the aqueous medium in which the monomer remains and the chain transfer agent is consumed; and polymerizing the remaining monomer.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWINGS

FIG. 1 is a table showing evaluation results regarding average molecular weight, fixability and residual amount of chain transfer agent in the Examples and Comparative Examples of the invention.

DETAILED DESCRIPTION OF THE EMBODIMENTS

The manufacturing method of a resin for developing agent according to one embodiment of the invention includes a step of polymerizing a radical polymerizable first monomer in an aqueous medium having a first polymerization initiator added therein in the presence of a chain transfer agent, thereby forming a resin particle having a first peak molecular weight;

and a step of polymerizing a radical polymerizable second monomer in the aqueous medium in which the chain transfer agent is consumed and a second polymerization initiator is added, thereby forming a resin particle having a second peak molecular weight.

Here, the first polymerization initiator and the second polymerization initiator may be the same or different. Furthermore, the first monomer and the second monomer may be the same or different.

Also, the manufacturing method of a resin for developing agent according to another embodiment of the invention includes a step of adding a first polymerization initiator in an aqueous medium; a step of adding a radical polymerizable monomer and a chain transfer agent in the aqueous medium; a step of polymerizing a part of the monomer; a step of adding a second polymerization initiator in the aqueous medium in which the monomer remains and the chain transfer agent is consumed; and a step of polymerizing the remaining monomer.

Here, the first polymerization initiator and the second polymerization initiator may be the same or different.

The aqueous medium refers to a medium containing, for example, 40 wt % or more of water and may contain a dispersant such as nonionic surfactants, anionic surfactants and cationic surfactants. As the nonionic surfactant, for example, high molecular surfactants such as polyethylene glycols, alkylphenol ethylene oxide adducts, and polyhydric alcohols may be used singly or in admixture of plurality thereof. As the anionic surfactant, for example, sulfuric acid ester salts, sulfonic acid salts, and phosphoric esters can be used. As the cationic surfactant, for example, amine salts and quaternary ammonium salts can be used. Such an aqueous medium is preferably controlled at 60 to 85° C. during the formation step of a resin particle.

Furthermore, as the polymerization initiator, a water-soluble initiator or an oil-soluble initiator can be used depending upon the polymerization method. Examples of useful water-soluble initiators include persulfuric acid salts such as potassium persulfate and ammonium persulfate; azo based compounds such as 2,2-azobis(2-aminopropane) and 2,2-azo-bisisobutylamidine hydrochloride; hydrogen peroxide; and benzoyl peroxide. Moreover, examples of useful oil-soluble initiator include azo based compounds such as azobisisobutyronitrile and azobisdimethylvaleronitrile; and peroxides such as benzoyl peroxide and dichlorobenzoyl peroxide. Then, if desired, a sulfur based reducing agent can be used as a redox based initiator. As such a reducing agent, a hydrogensulfite or a hydrogensulfite containing not more than 50% of a sulfur based reducing agent such as thiosulfuric acid can be used. In addition, if desired, a divalent iron ion may be jointly used as a catalyst.

The polymerization initiator is added while being divided into two parts. Its total amount is preferably from 0.1 to 5.0 wt % based on the total amount of the monomers. When the total amount is less than 0.1 wt %, smooth progress of the polymerization reaction is suppressed, whereas when it exceeds 5.0 wt %, the molecular weight distribution is extremely shifted into the low molecular weight side so that not only control to the desired distribution of the invention becomes difficult, but also the treatment of reaction heat becomes difficult. Then, a weight ratio of the amount of second addition (of the second polymerization initiator) to the amount of first addition (of the first polymerization initiator) is preferably from 1/3 to 3. This is because though the weight ratio is properly controlled so as to obtain the desired molecular distribution, when it is less than 1/3 or exceeds 3, appropriate molecular weight distribution is not obtained, and fixability of the toner is deteriorated. Furthermore, the amount of first addition (of the first polymerization initiator) is preferably from 0.1 to 30 wt %, and more preferably from 4 to 15 wt % based on the amount of the chain transfer agent. This is because when the amount of first addition is less than 0.1 wt %, the formation of ultrahigh molecular substances, which is not in line with the objects of the invention, becomes remarkable, whereas it exceeds 30 wt %, the excessive formation of low molecular substances is caused.

As the radical polymerizable monomer, aromatic vinyl monomers such as styrene, methylstyrene, methoxystyrene, phenylstyrene, and chlorostyrene; ester based monomers such as methyl acrylate, ethyl acrylate, butyl acrylate, methyl methacrylate, ethyl methacrylate, and butyl methacrylate; carboxylic acid-containing monomers such as acrylic acid, methacrylic acid, fumaric acid, and maleic acid; amine based monomers such as aminoacrylate, acrylamide, methacrylamide, vinylpyridine, and vinylpyrrolidone; and derivatives thereof can be used singly or in admixture of plurality thereof. Such a monomer or the like is preferably added dropwise as a monomer latex as dispersed in a dispersion in the aqueous medium. Furthermore, it is also possible to properly add a monomer the same as or different from the previously added monomer, for example, at a point of time when the chain transfer agent has been substantially consumed.

As the chain transfer agent, a mercapto group (SH group)-containing compound for synthesizing a low molecular substance, such as octanethiol, decanethiol, dodecanethiol, and 3-mercaptopropionic acid esters, can be used. The kind and amount of addition of the chain transfer agent are adjusted at a desired timing, for example, in such a manner that it is substantially consumed at the time of completion of the addition of the radical polymerizable monomer. The chain transfer agent is preferably added in an amount of from 0.01 to 1.0 mol % based on the total amount of the radical polymerizable monomers. This is because when the amount of addition is less than 0.01 mol %, it is difficult to sufficiently form a low molecular substance, whereas when it exceeds 1.0 mol %, a part of the chain transfer agent remains at the desired timing so that a low molecular substance is excessively formed. Furthermore, the chain transfer agent preferably has a chain transfer constant against styrene at 60° C. of from 0.5 to 30. This is because when the chain transfer constant is less than 0.5, a chain transfer reaction rate is lowered so that the synthesis of a low molecular substance becomes difficult, whereas when it exceeds 30, a chain transfer reaction rate is excessively high so that control of the molecular weight distribution is hindered.

In addition, as a crosslinking agent, for example, a compound having two or more unsaturated bonds such as divinylbenzene, divinyl ether, divinylnaphthalene, and diethylene glycol methacrylate may be used.

In one embodiment of the invention, a primary particle of the resin for development which is formed by emulsion polymerization preferably has a volume average particle diameter of from 0.01 to 3 μm. When the particle diameter is less than 0.01 μm, the amount of the dispersant to be used increases, whereas when it exceeds 3 μm, the particle size distribution of the ultimately obtained toner particle is liable to become broad. The particle diameter is more preferably from 0.05 to 1 μm.

Such a primary particle of the resin for development is dispersed in a solution and mixed with a coloring agent dispersion and optionally a dispersion of a mold releasing agent such as waxes. Then, a repulsive force between the particles is relieved or removed by pH adjustment, heating, addition of a salt, or addition of a coagulating agent. When the repulsive force between the particles is relieved or removed, the resin particle, the coloring agent particle and the wax particle are coagulated to form a coagulated particle.

Then, the formed coagulated particle is dispersed in a solution and fused by heating at a glass transition temperature Tg of the resin or higher or a melting point of the wax (mold releasing agent) or higher, thereby forming a fused particle. Alternatively, the coagulated particle is encapsulated to form an encapsulated particle. In encapsulating the coagulated particle, a resin particle or the like is first added in a dispersion of the coagulated particle and attached to the surface of the coagulated particle. Then, the attached resin particle is fused on the surface of the coagulated particle. At this time, a polymerizable monomer may be added in the dispersion of the coagulated particle, adsorbed on the surface of the coagulated particle and further swollen, followed by polymerizing the monomer. Furthermore, it is also possible to achieve encapsulation by fusing the coagulated particle, washing and drying the fused particle and mechanically attaching the resin particle on the surface of the fused particle using a hybridizer or the like. At this time, the Tg of the resin particle is preferably 50° C. or higher. This is because when the Tg is lower than 50° C., the preservability of the toner becomes worse. The Tg is more preferably 55° C. or higher.

Then, after a washing step or the like, a charge controlling agent or the like is added to form a toner particle.

The invention will be specifically described below with reference to the Examples. Incidentally, in the Examples and Comparative Examples, in measuring a volume average particle diameter, when the particle diameter was not more than 2 μm, a laser diffraction particle size analyzer SALD-7000 (manufactured by Shimadzu Corporation) was used, whereas when the particle diameter exceeded 2 μm, COLTER MULTISIZER II (manufactured by Coulter Electronics Limited) was used.

Furthermore, in measuring a molecular weight of a synthesized polymer, Waters' GPC molecular weight analyzers 2695 and 2414 were used. Moreover, a molecular weight of a monomer (containing a chain transfer agent) was measured; what monomer (containing a chain transfer agent) was assigned to an inherent peak of gas chromatograph was confirmed; and then, in quantifying a concentration (ppm) of the monomer (containing a chain transfer agent), a gas chromatograph mass spectrometer GCMS-QP2010 (manufactured by Shimadzu Corporation) was used.

EXAMPLE 1

First of all, a resin particle dispersion, a coloring agent dispersion and a mold releasing agent particle dispersion were prepared in the following manners.

(Preparation of Resin Particle Dispersion)

First of all, an aqueous medium having, as dispersants, 1.8 g of a nonionic surfactant (manufactured by Sanyo Chemical Industries, Ltd.) and 3 g of an anionic surfactant (manufactured by Dai-ichi Kogyo Seiyaku Co., Ltd.) dispersed in 811.2 g of ion exchanged water was prepared, and 300 g of styrene, 36 g of butyl acrylate and 4.5 g of acrylic acid as radical polymerizable monomers and 13.5 g of dodecanethiol as a chain transfer agent were emulsified in the aqueous medium, thereby preparing a monomer mixed liquid.

Subsequently, the inside of a separable flask equipped with a stirrer and a condenser was sealed with nitrogen; the temperature of an aqueous medium having dispersants added therein in a similar manner was raised to 75° C.; and 20 g of a 10% ammonium persulfate solution as a polymerization initiator was added in this aqueous medium. Then, the aqueous medium having the polymerization initiator added therein was kept at 75° C., and the previously prepared monomer mixed liquid was added dropwise and dispersed in this aqueous medium over 3 hours. This was kept at 75° C. and ripened by stirring for one hour, thereby substantially consuming the chain transfer agent. Then, 10 g of a 10% ammonium persulfate solution as a polymerization initiator was further added and ripened by stirring for 3 hours, thereby undergoing emulsion polymerization for 7 hours in total. There was thus prepared a resin particle dispersion.

The formed resin particle had a volume average particle diameter of 100 nm, a glass transition temperature Tg of 60° C. and a weight average molecular weight Mw of 38,000.

(Preparation of Coloring Agent Dispersion)

100 g of carbon black (manufactured by Cabot Corporation), 10 g of an anionic surfactant (manufactured by Dai-ichi Kogyo Seiyaku Co., Ltd.) and 390 g of ion exchanged water were mixed and dispersed using a homogenizer (manufactured by IKA Works), thereby preparing a coloring agent dispersion having a volume average particle diameter of 150 nm.

(Preparation of Mold Releasing Agent Particle Dispersion)

100 g of a rice wax (having the melting point of 80° C. manufactured by Toakasei Co., Ltd.), 10 g of an anionic surfactant (manufactured by Kao Corporation) and 390 g of ion exchanged water were mixed and dispersed using a homogenizer (manufactured by IKA Works), thereby preparing a mold releasing agent particle dispersion having a volume average particle diameter of 102 nm.

A coagulated particle, a fused particle and a toner particle were formed from the thus prepared resin particle dispersion, coloring agent dispersion and mold releasing agent particle dispersion in the following manners.

(Formation of Coagulated Particle)

313 g of the prepared resin particle dispersion, 56 g of the prepared coloring agent dispersion and 120 g of the prepared mold releasing agent particle dispersion were mixed and uniformly dispersed using a homogenizer (manufactured by IKA Works). Then, 10 g of ion exchanged water containing polyaluminum chloride (manufactured by Central Glass Co., Ltd.) was additionally added in the mixed and dispersed liquid. The mixture was kept at 50° C. for one hour while weakly stirring, thereby forming a coagulated particle having a volume average particle diameter of 5.0 μm.

(Formation of Fused Particle)

The formed coagulated particle was heated and kept at 95° C. for 5 hours in the dispersion, thereby forming a fused particle.

(Formation of Toner Particle)

A step of washing the formed fused particle with ion exchanged water and filtration is repeated. Then, the fused particle from which the water had been removed by filtration was dried for 10 hours by a vacuum dryer, thereby forming a dry particle having a volume average particle diameter of 5.0 μm. As a result of observing a cross section of this dry particle by a transmission electron microscope, it was confirmed that the mold releasing agent was randomly dispersed in the resin. 3 wt % of silica (manufactured by Nippon Aerosil Co., Ltd.) and 0.5 wt % of titanium oxide (manufactured by Ishihara Sangyo Kaisha, Ltd.) were added based on 100 wt % of the dry particle and mixed by a Henschel mixer (manufactured by Mitsui Mining Co., Ltd.), thereby forming a toner particle having a content of the mold releasing agent of 15%.

(Evaluation of Fixability)

Using the formed developing agent, fixability was evaluated.

Using a modified machine of a full color copier FC-22 as manufactured by Toshiba Tec Corporation, a development condition was set up such that the amount of attachment of the toner to paper was 1.0 mg/cm$^2$. By changing the fixing temperature of upper and lower rolls, a monochromic solid chart was outputted on plain paper of 80 g/m$^2$ under a fixing condition at a roll speed of 125 mm/sec and in a nip width of 9 mm, thereby evaluating fixability.

The results from evaluation of the fixability are shown in Table 1. As shown in Table 1, it is noted that there is obtained good fixability such that a non-offset temperature width is from 130 to 180° C.

EXAMPLE 2

A toner particle was formed in the same manner as in Example 1, except for preparing a resin particle dispersion in the following manner, and fixability was evaluated in the same manner. That is, this Example differs from Example 1 in a point that n-hexyl 3-mercaptopropionate is used as the chain transfer agent.

(Preparation of Resin Particle Dispersion)

First of all, an aqueous medium having, as dispersants, 1.8 g of a nonionic surfactant (manufactured by Sanyo Chemical Industries, Ltd.) and 3 g of an anionic surfactant (manufactured by Dai-ichi Kogyo Seiyaku Co., Ltd.) dispersed in 811.2 g of ion exchanged water was prepared, and 300 g of styrene, 36 g of butyl acrylate and 4.5 g of acrylic acid as radical polymerizable monomers and 13.5 g of n-hexyl 3-mercaptopropionate as a chain transfer agent were emulsified in the aqueous medium, thereby preparing a monomer mixed liquid.

Subsequently, the inside of a separable flask equipped with a stirrer and a condenser was sealed with nitrogen; the temperature of an aqueous medium having dispersants added therein in a similar manner was raised to 75° C.; and 20 g of a 10% ammonium persulfate solution as a polymerization initiator was added in this aqueous medium. Then, the aqueous medium having the polymerization initiator added therein was kept at 75° C., and the previously prepared monomer mixed liquid was added dropwise and dispersed in this aqueous medium over 3 hours. This was kept at 75° C. and ripened by stirring for one hour, thereby substantially consuming the chain transfer agent. Then, 10 g of a 10% ammonium persulfate solution as a polymerization initiator was further added and ripened by stirring for 3 hours, thereby undergoing emulsion polymerization for 7 hours in total. There was thus prepared a resin particle dispersion.

The formed resin particle had a volume average particle diameter of 100 nm, a Tg of 60° C. and an Mw of 28,000.

In this Example, the results from evaluation of the fixability are shown in Table 1. As shown in Table 1, it is noted that there is obtained good fixability such that a non-offset temperature width is from 120 to 170° C.

EXAMPLE 3

A toner particle was formed in the same manner as in Example 1, except for preparing a resin particle dispersion in the following manner, and fixability was evaluated in the same manner. This Example differs from Example 1 in a point that 2-ethylhexyl 3-mercaptopropionate is used as the chain transfer agent.

(Preparation of Resin Particle Dispersion)

First of all, an aqueous medium having, as dispersants, 1.8 g of a nonionic surfactant (manufactured by Sanyo Chemical Industries, Ltd.) and 3 g of an anionic surfactant (manufactured by Dai-ichi Kogyo Seiyaku Co., Ltd.) dispersed in 811.2 g of ion exchanged water was prepared, and 300 g of styrene, 36 g of butyl acrylate and 4.5 g of acrylic acid as radical polymerizable monomers and 13.5 g of 2-ethylhexyl 3-mercaptopropionate as a chain transfer agent were emulsified in the aqueous medium, thereby preparing a monomer mixed liquid.

Subsequently, the inside of a separable flask equipped with a stirrer and a condenser was sealed with nitrogen; the temperature of an aqueous medium having dispersants added therein in a similar manner was raised to 75° C.; and 20 g of a 10% ammonium persulfate solution as a polymerization initiator was added in this aqueous medium. Then, the aqueous medium having the polymerization initiator added therein was kept at 75° C., and the previously prepared monomer mixed liquid was added dropwise and dispersed in this aqueous medium over 3 hours. This was kept at 75° C. and ripened by stirring for one hour, thereby substantially consuming the chain transfer agent. Then, 10 g of a 10% ammonium persulfate solution as a polymerization initiator was further added and ripened by stirring for 3 hours, thereby undergoing emulsion polymerization for 7 hours in total. There was thus prepared a resin particle dispersion.

The formed resin particle had a volume average particle diameter of 100 nm, a Tg of 60° C. and an Mw of 31,000.

In this Example, the results from evaluation of the fixability are shown in Table 1. As shown in Table 1, it is noted that there is obtained good fixability such that a non-offset temperature width is from 125 to 180° C.

EXAMPLE 4

A toner particle was formed in the same manner as in Example 1, except for preparing a resin particle dispersion in the following manner, and fixability was evaluated in the same manner. That is, this Example differs from Example 3 in a point that sodium hydrogensulfite is added as a reducing agent in the post-polymerization initiator.

(Preparation of Resin Particle Dispersion)

First of all, an aqueous medium having, as dispersants, 1.8 g of a nonionic surfactant (manufactured by Sanyo Chemical Industries, Ltd.) and 3 g of an anionic surfactant (manufactured by Dai-ichi Kogyo Seiyaku Co., Ltd.) dispersed in 811.2 g of ion exchanged water was prepared, and 300 g of styrene, 36 g of butyl acrylate and 4.5 g of acrylic acid as radical polymerizable monomers and 13.5 g of dodecanethiol as a chain transfer agent were emulsified in the aqueous medium, thereby preparing a monomer mixed liquid.

Subsequently, the inside of a separable flask equipped with a stirrer and a condenser was sealed with nitrogen; the temperature of an aqueous medium having dispersants added therein in a similar manner was raised to 75° C.; and 20 g of a 10% ammonium persulfate solution as a polymerization initiator was added in this aqueous medium. Then, the aqueous medium having the polymerization initiator added therein was kept at 75° C., and the previously prepared monomer mixed liquid was added dropwise and dispersed in this aqueous medium over 3 hours. This was kept at 75° C. and ripened by stirring for one hour, thereby substantially consuming the chain transfer agent. Then, 10 g of a 10% ammonium persulfate solution as a polymerization initiator was further added, and 15 g of a 10% sodium hydrogensulfite solution was further added as a reducing agent. This was ripened by stirring for 3 hours, thereby undergoing emulsion polymerization for 7 hours in total. There was thus prepared a resin particle dispersion.

The formed resin particle had a volume average particle diameter of 100 nm, a Tg of 60° C. and an Mw of 41,000.

In this Example, the results from evaluation of the fixability are shown in Table 1. As shown in Table 1, it is noted that there is obtained good fixability such that a non-offset temperature width is from 130 to 180° C.

COMPARATIVE EXAMPLE 1

A toner particle was formed in the same manner as in Example 1, except for preparing a resin particle dispersion in the following manner, and fixability was evaluated in the same manner. That is, this Comparative Example differs from Example 1 in a point that carbon tetrabromide having a chain transfer constant of 0.2 is used as the chain transfer agent.

(Preparation of Resin Particle Dispersion)

First of all, an aqueous medium having, as dispersants, 1.8 g of a nonionic surfactant (manufactured by Sanyo Chemical Industries, Ltd.) and 3 g of an anionic surfactant (manufactured by Dai-ichi Kogyo Seiyaku Co., Ltd.) dispersed in 806.7 g of ion exchanged water was prepared, and 300 g of styrene, 36 g of butyl acrylate and 4.5 g of acrylic acid as radical polymerizable monomers and 13.5 g of dodecanethiol and 4.5 g of carbon tetrabromide as chain transfer agents were emulsified in the aqueous medium, thereby preparing a monomer mixed liquid.

Subsequently, the inside of a separable flask equipped with a stirrer and a condenser was sealed with nitrogen; the temperature of an aqueous medium having dispersants added therein in a similar manner was raised to 75° C.; and 20 g of a 10% ammonium persulfate solution as a polymerization initiator was added in this aqueous medium. Then, the aqueous medium having the polymerization initiator added therein was kept at 75° C., and the previously prepared monomer mixed liquid was added dropwise and dispersed in this aqueous medium over 3 hours. This was kept at 75° C. and ripened by stirring for one hour, thereby substantially consuming the chain transfer agent. Then, 10 g of a 10% ammonium persulfate solution as a polymerization initiator was further added and ripened by stirring for 3 hours, thereby undergoing emulsion polymerization for 7 hours in total. There was thus prepared a resin particle dispersion.

The formed resin particle had a volume average particle diameter of 100 nm, a Tg of 60° C. and an Mw of 18,000.

In this Comparative Example, the results from evaluation of the fixability are shown in Table 1. As shown in Table 1, it is noted that there is not obtained good flexibility such that a non-offset temperature width is from 120 to 150° C., especially the offset control in the high temperature side is remarkably poor.

COMPARATIVE EXAMPLE 2

A toner particle was formed in the same manner as in Example 1, except for preparing a resin particle dispersion in the following manner, and fixability was evaluated in the same manner. That is, this Comparative Example differs from Example 2 in a point that carbon tetrabromide having a chain transfer constant of 0.2 is jointly used as the chain transfer agent.

(Preparation of Resin Particle Dispersion)

First of all, an aqueous medium having, as dispersants, 1.8 g of a nonionic surfactant (manufactured by Sanyo Chemical Industries, Ltd.) and 3 g of an anionic surfactant (manufactured by Dai-ichi Kogyo Seiyaku Co., Ltd.) dispersed in 806.7 g of ion exchanged water was prepared, and 300 g of styrene, 36 g of butyl acrylate and 4.5 g of acrylic acid as radical polymerizable monomers and 13.5 g of n-hexyl 3-mercaptopropionate and 4.5 g of carbon tetrabromide as chain transfer agents were emulsified in the aqueous medium, thereby preparing a monomer mixed liquid.

Subsequently, the inside of a separable flask equipped with a stirrer and a condenser was sealed with nitrogen; the temperature of an aqueous medium having dispersants added therein in a similar manner was raised to 75° C.; and 20 g of a 10% ammonium persulfate solution as a polymerization initiator was added in this aqueous medium. Then, the aqueous medium having the polymerization initiator added therein was kept at 75° C., and the previously prepared monomer mixed liquid was added dropwise and dispersed in this aqueous medium over 3 hours. This was kept at 75° C. and ripened by stirring for one hour, thereby substantially consuming the chain transfer agent. Then, 10 g of a 10% ammonium persulfate solution as a polymerization initiator was further added and ripened by stirring for 3 hours, thereby undergoing emulsion polymerization for 7 hours in total. There was thus prepared a resin particle dispersion.

The formed resin particle had a volume average particle diameter of 100 nm, a Tg of 60° C. and an Mw of 18,000.

In this Comparative Example, the results from evaluation of the fixability are shown in Table 1. As shown in Table 1, it is noted that there is not obtained good flexibility such that a non-offset temperature width is from 120 to 150° C., especially the offset control in the high temperature side is remarkably poor.

COMPARATIVE EXAMPLE 3

A toner particle was formed in the same manner as in Example 1, except for preparing a resin particle dispersion in the following manner, and fixability was evaluated in the same manner. That is, this Comparative Example differs from Example 3 in a point that carbon tetrabromide having a chain transfer constant of 0.2 is jointly used as the chain transfer agent.

(Preparation of Resin Particle Dispersion)

First of all, an aqueous medium having, as dispersants, 1.8 g of a nonionic surfactant (manufactured by Sanyo Chemical Industries, Ltd.) and 3 g of an anionic surfactant (manufactured by Dai-ichi Kogyo Seiyaku Co., Ltd.) dispersed in 806.7 g of ion exchanged water was prepared, and 300 g of styrene, 36 g of butyl acrylate and 4.5 g of acrylic acid as radical polymerizable monomers and 13.5 g of 2-ethylhexyl 3-mercaptopropionate and 4.5 g of carbon tetrabromide as chain transfer agents were emulsified in the aqueous medium, thereby preparing a monomer mixed liquid.

Subsequently, the inside of a separable flask equipped with a stirrer and a condenser was sealed with nitrogen; the temperature of an aqueous medium having dispersants added therein in a similar manner was raised to 75° C.; and 20 g of a 10% ammonium persulfate solution as a polymerization initiator was added in this aqueous medium. Then, the aqueous medium having the polymerization initiator added therein was kept at 75° C., and the previously prepared monomer mixed liquid was added dropwise and dispersed in this aqueous medium over 3 hours. This was kept at 75° C. and ripened by stirring for one hour, thereby substantially consuming the chain transfer agent. Then, 10 g of a 10% ammonium persulfate solution as a polymerization initiator was further added and ripened by stirring for 3 hours, thereby undergoing emulsion polymerization for 7 hours in total. There was thus prepared a resin particle dispersion.

The formed resin particle had a volume average particle diameter of 100 nm, a Tg of 60° C. and an Mw of 18,000.

In this Comparative Example, the results from evaluation of the fixability are shown in Table 1. As shown in Table 1, it is noted that there is not obtained good flexibility such that a non-offset temperature width is from 120 to 150° C., especially the offset control in the high temperature side is remarkably poor.

COMPARATIVE EXAMPLE 4

A toner particle was formed in the same manner as in Example 1, except for preparing a resin particle dispersion in the following manner, and fixability was evaluated in the same manner. That is, this Comparative Example differs from Example 1 in a point that a low molecular substance and a high molecular substance are separately prepared and mixed.

(Preparation of Low Molecular Substance Resin Particle Dispersion)

First of all, an aqueous medium having, as dispersants, 0.9 g of a nonionic surfactant (manufactured by Sanyo Chemical Industries, Ltd.) and 1.5 g of an anionic surfactant (manufactured by Dai-ichi Kogyo Seiyaku Co., Ltd.) dispersed in 387.6 g of ion exchanged water was prepared, and 275 g of styrene, 33 g of butyl acrylate and 5.5 g of acrylic acid as radical polymerizable monomers and 12.375 g of dodecanethiol and 4.125 g of carbon tetrabromide as chain transfer agents were emulsified in the aqueous medium, thereby preparing a monomer mixed liquid.

Subsequently, the inside of a separable flask equipped with a stirrer and a condenser was sealed with nitrogen; the temperature of an aqueous medium having dispersants added therein in a similar manner was raised to 75° C.; and 10 g of a 10% ammonium persulfate solution as a polymerization initiator was added in this aqueous medium. Then, the aqueous medium having the polymerization initiator added therein was kept at 75° C., and the previously prepared monomer mixed liquid was added dropwise and dispersed in this aqueous medium over 3 hours. This was kept at 75° C. and stirred for one hour, and 5 g of a 10% ammonium persulfate solution was further addded, followed by ripening by stirring for 3 hours to undergo emulsion polymerization for 7 hours in total. There was thus prepared a low molecular substance resin particle dispersion. The formed resin particle had a volume average particle diameter of 105 nm, a Tg of 60° C. and an Mw of 24,000.

(Preparation of High Molecular Substance Resin Particle Dispersion)

First of all, an aqueous medium having, as dispersants, 0.09 g of a nonionic surfactant (manufactured by Sanyo Chemical Industries, Ltd.) and 0.15 g of an anionic surfactant (manufactured by Dai-ichi Kogyo Seiyaku Co., Ltd.) dispersed in 38.8 g of ion exchanged water was prepared, and 20 g of styrene, 9.5 g of butyl acrylate and 0.5 g of acrylic acid as radical polymerizable monomers were emulsified in the aqueous medium, thereby preparing a monomer mixed liquid.

Subsequently, the inside of a separable flask equipped with a stirrer and a condenser was sealed with nitrogen; the temperature of an aqueous medium having dispersants added therein in a similar manner was raised to 75° C.; and 1 g of a 10% ammonium persulfate solution as a polymerization initiator was added in this aqueous medium. Then, the aqueous medium having the polymerization initiator added therein was kept at 75° C., and the previously prepared monomer mixed liquid was added dropwise and dispersed in this aqueous medium over 3 hours. This was kept at 75° C. and stirred for one hour, and 0.5 g of a 10% ammonium persulfate solution was further added, followed by ripening by stirring for 3 hours to undergo emulsion polymerization for 7 hours in total. There was thus prepared a high molecular substance resin particle dispersion. The formed resin particle had a volume average particle diameter of 105 nm, a Tg of 60° C. and an Mw of 440,000.

(Preparation of Resin Particle Dispersion)

The thus prepared low molecular substance resin particle dispersion and high molecular substance resin particle dispersion were mixed to prepare a resin particle dispersion.

In this Comparative Example, the results from evaluation of the fixability are shown in Table 1. As shown in Table 1, it is noted that there is not obtained good flexibility such that a non-offset temperature width is from 140 to 170° C., especially the offset control in the low temperature side is remarkably poor.

It is noted from Table 1 that in the developing agents of Examples 1 to 4, Mw/Mn of the weight average molecular weight to the number average molecular weight is large as 6 or more and good molecular weight distribution is obtained so that good fixability is obtained, whereas in the developing agents of Comparative Examples 1 to 3, especially the offset control in the high temperature side is remarkably poor so that good fixability is not obtained. It is thought that this is caused by the matter that a high molecular substance is in short, resulting in a shortage of viscoelasticity at the time of high temperatures.

Furthermore, in the developing agent of Comparative Example 4, since a chain transfer agent having a chain transfer constant of less than 0.5 is jointly used in synthesizing a low molecular substance, Mw is low. This is because even when ripened, a high molecular substance having a shoulder in the high molecular weight side or one or more independent peaks in the molecular weight distribution is hardly grown. For that reason, since a separately prepared high molecular substance is mixed, a high value as 8.03 is obtained as Mw/Mn. However, since a ratio between the low molecular substance and the high molecular substance becomes non-uniform locally, the fixability is locally lowered and a clear image is hardly obtained.

In Examples 1 to 4, immediately after completion of the dropwise addition of the monomers, since a high molecular substance is not formed due to the presence of a chain transfer agent, the Mw is low. However, after consumption of the chain transfer agent, by adding a polymerization initiator and undergoing ripening, a high molecular substance is formed due to the remaining monomers, and a relatively large Mw is obtained. In this way, since a low molecular substance and a high molecular substance are uniformly present in a single toner particle, local non-uniformity does not occur, and thermal properties become extremely uniform. As a result, the toner particle is liable to extremely uniformly attach to a transfer material such as papers into details, whereby good fixability can be obtained. Then, due to good fixability, it becomes possible to easily obtain an image having high image quality and high reliability without needs of complicated processes.

Furthermore, as shown in Examples 1 to 4, by optimizing the amounts and kinds of the polymerization initiator and chain transfer agent with respect to the monomers, it is possible to easily obtain a resin particle having good molecular weight distribution in a single batch without needs of complicated control.

In addition, in Examples 1 to 4, an offensive odor as generated at the time of fixation is suppressed. This is because since the process is desired so as to consume the chain transfer agent on the way of the synthesis, the chain transfer agent does not substantially remain such that its residual amount is not more than 30 ppm. Furthermore, in Example 4, since after substantial consumption of the chain transfer agent, a reducing agent is added along with the polymerization initiator, it is possible to reduce the amount of the remaining styrene monomer at relatively low temperatures. As a result, it becomes possible to shift the Mw into the high molecular weight side.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A manufacturing method of a resin for developing agent comprising:
    adding a first polymerization initiator in an aqueous medium;
    adding a radical polymerizable monomer and a chain transfer agent in the aqueous medium;
    polymerizing a part of the monomer;
    adding a second polymerization initiator in the aqueous medium in which the monomer remains and the chain transfer agent is consumed; and
    polymerizing the monomer remained,
    wherein the total amount of the first polymerization initiator and the second polymerization initiator is from 0.5 to 1.5 wt % based on the monomer.

2. The manufacturing method of a resin for developing agent according to claim 1, wherein the chain transfer agent is in an amount of from 0.01 to 1.0 mol % based on the monomer.

3. The manufacturing method of a resin for developing agent according to claim 1, wherein the chain transfer agent has a chain transfer constant against styrene at 60° C. of from 0.5 to 30.

4. The manufacturing method of a resin for developing agent according to claim 1, wherein the aqueous medium is water or a medium containing water and a dispersant.

5. The manufacturing method of a resin for developing agent according to claim 1, wherein the monomer is added in a state of a monomer single body or a monomer micelle or in a state that at least one of them is dispersed in a dispersion.

6. The manufacturing method of a resin for developing agent according to claim 1, wherein a weight ratio of the second polymerization initiator to the first polymerization initiator is from ⅓ to 3.

7. A manufacturing method of a resin for developing agent comprising:
    adding a first polymerization initiator in an aqueous medium;
    adding a radical polymerizable monomer and a chain transfer agent in the aqueous medium;
    polymerizing a part of the monomer;
    adding a second polymerization initiator in the aqueous medium in which the monomer remains and the chain transfer agent is consumed; and
    polymerizing the monomer remained,
    wherein the aqueous medium is controlled at from 60 to 85° C.

8. A manufacturing method of a resin for developing agent comprising:
    adding a first polymerization initiator in an aqueous medium;
    adding a radical polymerizable monomer and a chain transfer agent in the aqueous medium;
    polymerizing a part of the monomer;
    adding a second polymerization initiator in the aqueous medium in which the monomer remains and the chain transfer agent is consumed; and
    polymerizing the monomer remained,
    wherein a reducing agent is added in the second polymerization initiator.

9. The manufacturing method of a resin for developing agent according to claim 8, wherein the reducing agent contains a divalent iron ion, a sulfur based reducing agent, or a hydrogensulfite containing not more than 50% of a sulfur based reducing agent.

10. The manufacturing method of a resin for developing agent according to claim 1, wherein a residual amount of the chain transfer agent is not more than 30 ppm.

11. A manufacturing method of a resin for developing agent comprising:
    adding a first polymerization initiator in an aqueous medium;
    adding a radical polymerizable monomer and a chain transfer agent in the aqueous medium;
    polymerizing a part of the monomer;
    adding a second polymerization initiator in the aqueous medium in which the monomer remains and the chain transfer agent is consumed;
    polymerizing the monomer remained;
    coagulating the resin particle to form a coagulated particle; and
    fusing the coagulated particle with a particle containing at least a mold releasing agent and a coloring agent, thereby forming a fused particle.

12. The manufacturing method of a resin for developing agent according to claim 7, wherein the chain transfer agent is in an amount of from 0.01 to 1.0 mol % based on the monomer.

13. The manufacturing method of a resin for developing agent according to claim 7, wherein the chain transfer agent has a chain transfer constant against styrene at 60° C. of from 0.5 to 30.

14. The manufacturing method of a resin for developing agent according to claim 7, wherein a weight ratio of the second polymerization initiator to the first polymerization initiator is from ⅓ to 3.

15. The manufacturing method of a resin for developing agent according to claim 8, wherein the chain transfer agent is in an amount of from 0.01 to 1.0 mol % based on the monomer.

16. The manufacturing method of a resin for developing agent according to claim 8, wherein the chain transfer agent has a chain transfer constant against styrene at 60° C. of from 0.5 to 30.

17. The manufacturing method of a resin for developing agent according to claim 8, wherein a weight ratio of the second polymerization initiator to the first polymerization initiator is from ⅓ to 3.

18. The manufacturing method of a resin for developing agent according to claim 11, wherein the chain transfer agent is in an amount of from 0.01 to 1.0 mol % based on the monomer.

19. The manufacturing method of a resin for developing agent according to claim 11, wherein the chain transfer agent has a chain transfer constant against styrene at 60° C. of from 0.5 to 30.

20. The manufacturing method of a resin for developing agent according to claim 11, wherein a weight ratio of the second polymerization initiator to the first polymerization initiator is from ⅓ to 3.

* * * * *